(12) United States Patent
Yoshimura et al.

(10) Patent No.: US 11,394,042 B2
(45) Date of Patent: Jul. 19, 2022

(54) FAILURE DETECTION PROCESSING METHOD

(71) Applicant: HONDA MOTOR CO., LTD., Tokyo (JP)

(72) Inventors: Yusai Yoshimura, Wako (JP); Joji Nakashima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 19 days.

(21) Appl. No.: 17/023,812

(22) Filed: Sep. 17, 2020

(65) Prior Publication Data
US 2021/0091396 A1    Mar. 25, 2021

(30) Foreign Application Priority Data
Sep. 19, 2019 (JP) .............................. JP2019-170356

(51) Int. Cl.
| H01M 8/04664 | (2016.01) |
| G01F 23/24 | (2006.01) |
| H01M 8/04492 | (2016.01) |
| G01F 25/20 | (2022.01) |

(52) U.S. Cl.
CPC ...... *H01M 8/04686* (2013.01); *G01F 23/241* (2013.01); *G01F 25/24* (2022.01); *H01M 8/04492* (2013.01)

(58) Field of Classification Search
CPC ................................................ H02M 8/04686
See application file for complete search history.

(56) References Cited

U.S. PATENT DOCUMENTS

| 2011/0053026 A1* | 3/2011 | Ogawa .............. H01M 8/04231 429/440 |
| 2012/0219872 A1 | 8/2012 | Tanaka et al. |
| 2019/0190043 A1* | 6/2019 | Jeong ................ H01M 8/04514 |
| 2019/0245227 A1* | 8/2019 | Kim ...................... F24F 13/222 |

FOREIGN PATENT DOCUMENTS

| JP | H04-158223 A | 6/1992 |
| JP | 2006-147526 A | 6/2006 |
| JP | 2009-110714 A | 5/2009 |
| JP | 2009-152092 A | 7/2009 |
| WO | 2011/067927 A1 | 6/2011 |

OTHER PUBLICATIONS

Office Action dated Apr. 26, 2022 issued over the corresponding Japanese Patent Application No. 2019-170356 with the English translation thereof.

* cited by examiner

*Primary Examiner* — Paul M. West
*Assistant Examiner* — Mark A Shabman
(74) *Attorney, Agent, or Firm* — Carrier Blackman & Associates, P.C.; Joseph P. Carrier; William D. Blackman

(57) ABSTRACT

A fuel cell system includes a fuel cell stack, a gas liquid separator, a water level sensor, a drain valve, and a control unit. When a failure detection processing method is performed, a control unit makes a determination of main conditions where the water level sensor determines that water is present, a power generation current value of the fuel cell stack is not more than a predetermined current threshold value, a drain valve for discharging water in the gas liquid separator is open. Then, the control unit counts elapsed time when the main conditions are satisfied, and in the case where the main conditions are kept satisfied for the elapsed time which is larger than a time threshold value, the control unit determines that the water level sensor has a failure.

7 Claims, 5 Drawing Sheets

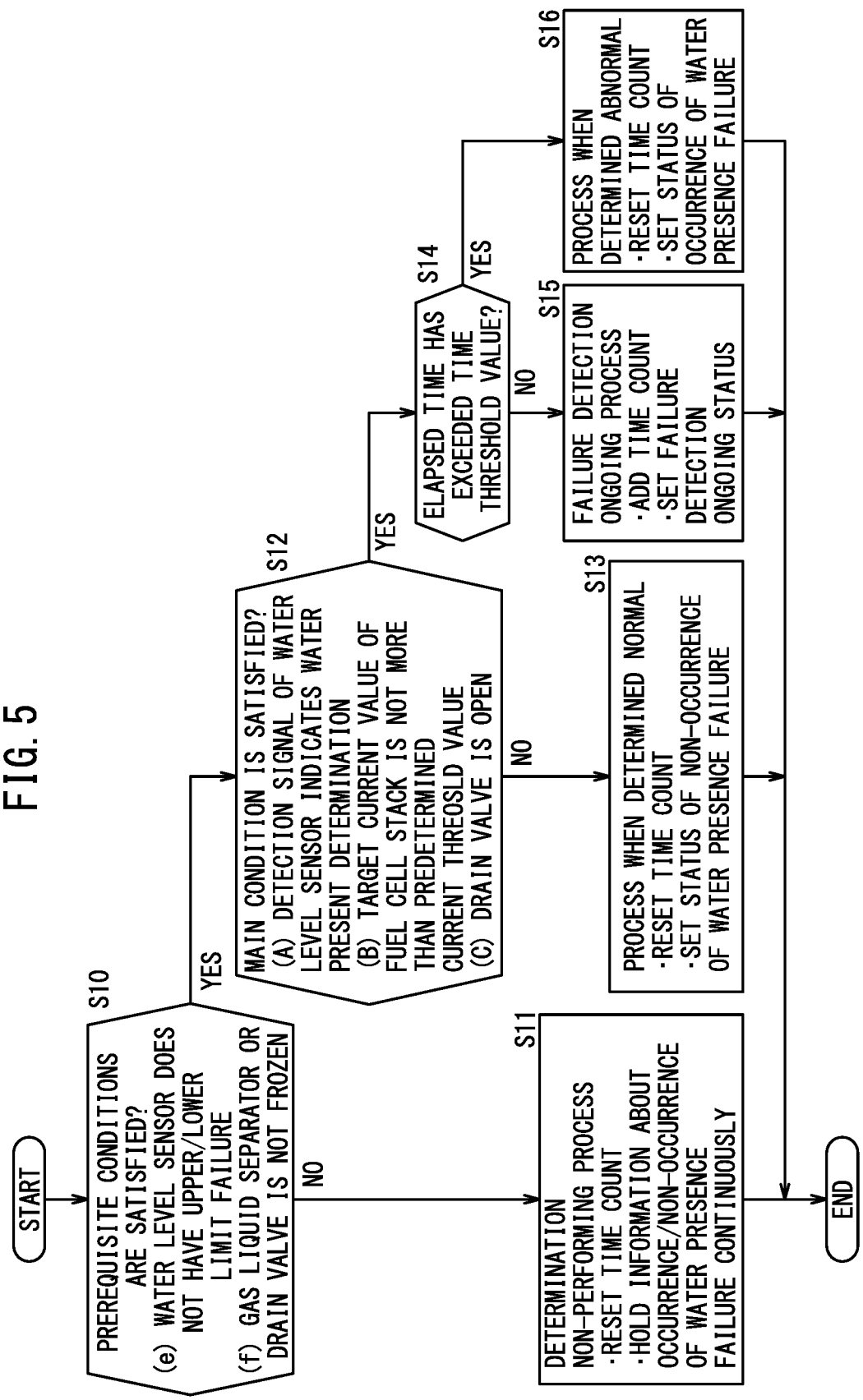

FAILURE DETECTION PROCESSING METHOD

CROSS-REFERENCE TO RELATED APPLICATION

This application is based upon and claims the benefit of priority from Japanese Patent Application No. 2019-170356 filed on Sep. 19, 2019, the contents of which are incorporated herein by reference.

BACKGROUND OF THE INVENTION

Field of the Invention

The present invention relates to a failure detection processing method of detecting a failure of a detection sensor capable of detecting the presence/absence of water accumulated in a gas liquid separator connected to a fuel cell stack.

Description of the Related Art

The fuel cell system includes a fuel cell stack for performing power generation consuming an anode gas (fuel gas such as hydrogen) and a cathode gas (oxygen-containing gas such as the air), and a gas liquid separator provided in an anode system apparatus and connected to the fuel cell stack. The gas liquid separator separates an anode off gas (air) and water (liquid water), and the water retained inside is discharged to the outside by opening the drain valve.

Further, as disclosed in Japanese Laid-Open Patent Publication No. 2006-147526, the fuel cell system, includes a water level sensor (detection sensor) for detecting the water level in the gas liquid separator. The control unit of the fuel cell system performs switching between opening and closing of the drain valve based on the detection signal of the water level sensor. In this manner, it is possible to suppress discharge of water and the anode gas from the gas liquid separator, and discharge the water at suitable timing.

SUMMARY OF THE INVENTION

In this regard, in the fuel cell system having the water level sensor as disclosed in Japanese Laid-Open Patent No. 2006-147526, when a failure occurs in the water level sensor, it becomes impossible to estimate the state of the water in the gas liquid separator. Therefore, it is desirable that the fuel cell system is a system which can recognize the failure of the water level failure.

The present invention relates to the above technique, and an object of the present invention is to provide a failure detection processing method which can determine a failure of the water level sensor easily and accurately.

In order to achieve the above object, according to an aspect of the present invention, a failure detection processing method of detecting a failure of a detection sensor capable of detecting the presence/absence of water accumulated in a gas liquid separator connected to a fuel cell stack is provided. The method includes a condition determination step of determining by a control unit that a main condition has been satisfied, when the detection sensor detects the presence of water, a power generation current value of the fuel cell stack is not more a predetermined current threshold value, and a drain valve configured to discharge the water in the gas liquid separator is open, and a failure determination step of determining by a control unit that the detection sensor has a failure, in the case where the main condition is kept satisfied for a time period which is larger than a time threshold value.

In the failure detection processing method, it is possible to easily and accurately determine the occurrence of a failure in the water level sensor.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a flow chart showing a failure detection processing method.

DESCRIPTION OF THE PREFERRED EMBODIMENTS

Hereinafter, a preferred embodiment of the present invention will be described in detail with reference to the accompanying drawings.

Figure 1:
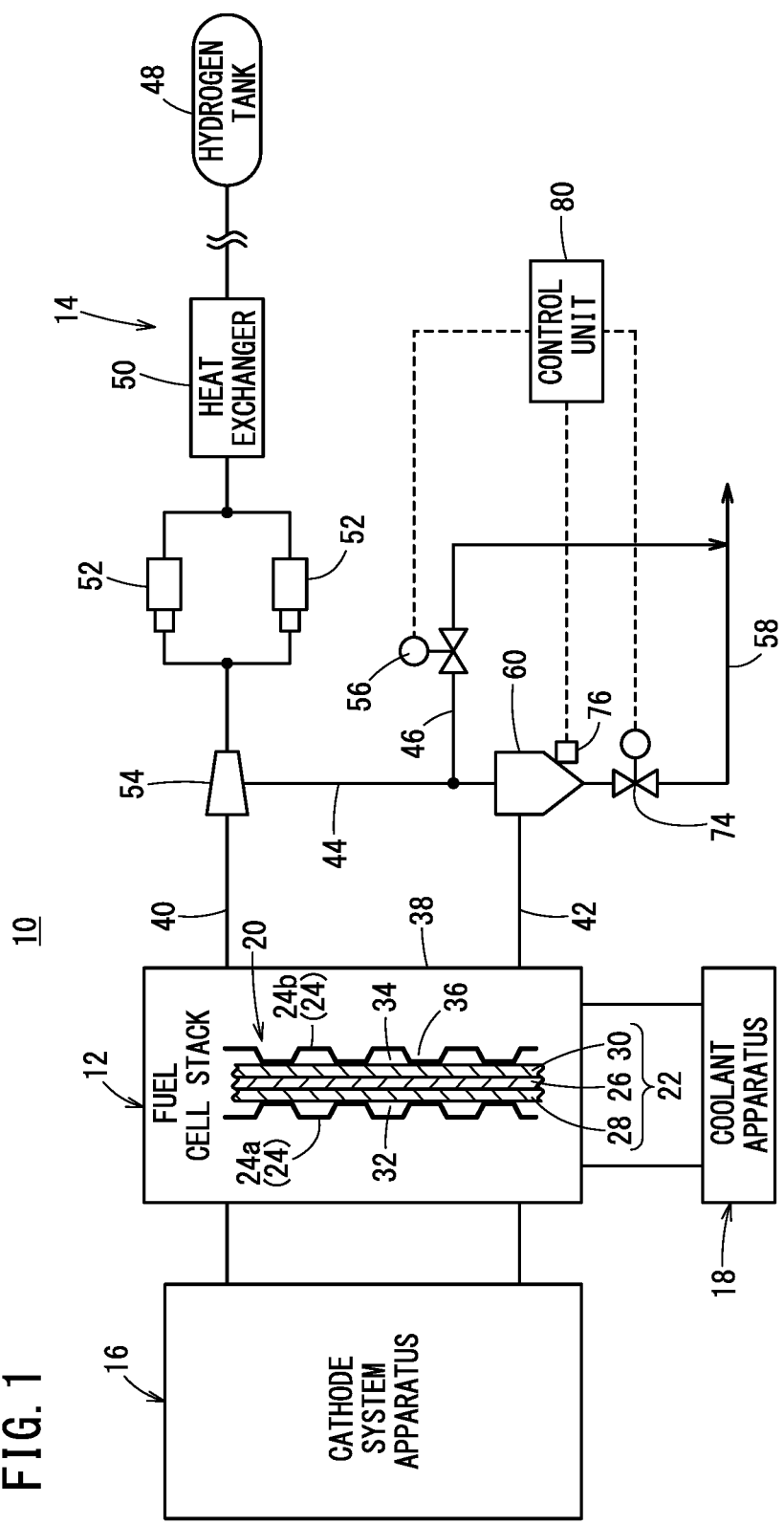
FIG. 1 is a diagram schematically showing overall structure of a fuel cell system according to an embodiment of the present invention.

As shown in FIG. 1, a fuel cell system 10 according to one embodiment of the present invention includes a fuel cell stack 12, an anode system apparatus 14, a cathode system apparatus 16, and a coolant apparatus 18. The fuel cell system 10 is mounted in a motor room of a fuel cell vehicle (fuel cell automobile) (not shown). The fuel cell system 10 supplies electrical energy generated in power generation of the fuel cell stack 12 to a battery, a motor, etc. (not shown) for enabling the fuel cell vehicle to travel.

The fuel cell stack 12 includes a plurality of power generation cells 20 for performing power generation by electrochemical reactions of an anode gas (fuel gas such as a hydrogen, etc.) and a cathode gas (oxygen-containing gas such as the air). In the state where the fuel cell stack 12 is mounted in the fuel cell vehicle, the plurality of power generation cells 20 are stacked together along a vehicle width direction into a stack body in a manner that electrode surfaces are oriented upright. It should be noted that the plurality of power generation cells 20 may be stacked together in a vehicle length direction (front/rear direction) or in the gravity direction of the fuel cell vehicle.

The power generation cell 20 is made up of a membrane electrode assembly 22 (hereinafter referred to as the MEA 22), and two separators 24 (a first separator 24a and a second separator 24b) sandwiching the MEA 22. The MEA 22 includes an electrolyte membrane 26 (e.g., solid polymer electrolyte membrane (cation ion exchange membrane)), an anode 28 provided on one surface of the electrolyte membrane 26, and a cathode 30 provided on the other side of the electrolyte membrane 26. An anode gas flow field 32 as a passage of an anode gas and a cathode gas flow field 34 as a passage of a cathode gas are formed in respective surfaces of the first and second separators 24a, 24b facing the MEA 22. Further, a coolant flow field 36 as a passage of a coolant is formed on surfaces of the first and second separators 24a, 24b facing each other, by stacking a plurality of the power generation cells 20 together.

Further, the fuel cell stack 12 includes a plurality of fluid passages (anode gas passages, cathode gas passages, and coolant passages) for allowing the anode gas, the cathode gas, and the coolant to flow in the stacking direction of the plurality of power generation cells 20. In the stack body, the anode gas passages are connected to the anode gas flow field 32, the cathode gas passages are connected to the cathode gas flow field 34, and the coolant passages are connected to the coolant flow field 36.

An anode system apparatus 14 supplies an anode gas to the fuel cell stack 12. In the fuel cell stack 12, the anode gas flows through the anode gas passage (anode gas supply passage), flows into the anode gas flow field 32, and is used in power generation at the anode 28. After the anode off gas (containing unconsumed hydrogen) consumed in power generation is discharged from the anode gas flow field 32 into the anode gas passage (anode gas discharge passage), the anode off gas is discharged to the outside of the fuel cell stack 12, into the anode system apparatus 14.

Further, the cathode gas pressurized by the cathode system apparatus 16 is supplied to the fuel cell stack 12. In the fuel cell stack 12, the cathode gas flows through the cathode gas passage (cathode gas supply passage) into the cathode gas flow field 34, and is used in power generation at the cathode 30. The cathode off gas used in power generation flows from the cathode gas flow field 34 into the cathode gas passage (cathode discharge passage), and the cathode gas is discharged to the outside of the fuel cell stack 12, into the cathode system apparatus 16.

Further, the coolant is supplied by the coolant apparatus 18 into the fuel cell stack 12. In the fuel cell stack 12, the coolant flows through the coolant passage (coolant supply passage) into the coolant flow field 36, and cools the power generation cells 20. The coolant which cooled the power generation cells 20 flows from the coolant flow field 36 into the coolant passage (coolant discharge passage), and the coolant is discharged to the outside of the fuel cell stack 12 into the coolant apparatus 18.

Further, in the fuel cell stack 12 according to the embodiment of the present invention, the stack body of the power generation cells 20 is accommodated inside a stack case 38 having a rectangular cylindrical shape. At both ends of the stack body in a stacking direction, terminal plates (not shown) are provided, and insulating plates (not shown) are provided outside the terminal plates, and end plates (not shown) are provided outside the insulating plates. The end plates apply the tightening load to each of the power generation cells 20 in the stacking direction.

The anode system apparatus 14 of the fuel cell system 10 includes an anode supply pipe 40 for supplying the anode gas to the fuel cell stack 12, and an anode discharge pipe 42 for discharging the anode off gas from the fuel cell stack 12. Further, a circulation bypass pipe 44 for returning the unreacted hydrogen contained in the anode off gas from the anode discharge pipe 42 to the anode supply pipe 40 is connected to a position between the anode supply pipe 40 and the anode discharge pipe 42. Further, a purge pipe 46 is connected to the circulation bypass pipe 44, and the anode off gas from the circulation circuit of the anode system apparatus 14 is discharged through the purge pipe 46.

Examples of the auxiliary devices of the anode system apparatus 14 include a hydrogen tank 48, a heat exchanger 50, a plurality of injectors 52, an ejector 54, a purge valve 56, and a gas liquid separator 60.

For example, the hydrogen tank 48 is provided on the rear side of the fuel cell vehicle, and connected to one end (the upstream end) of the anode supply pipe 40. The hydrogen tank 48 supplies the stored high pressure anode gas (hydrogen) to the anode supply pipe 40 at suitable timing. The fuel cell system 10 is mounted in a motor room of a fuel cell vehicle (fuel cell automobile) (not shown). The fuel cell system 10 supplies electrical energy generated in power generation of the fuel cell stack 12 to a battery, a motor, etc. (not shown) for enabling the fuel cell vehicle to travel.

The anode gas is supplied from the hydrogen tank 48 to the heat exchanger 50 at the reduced pressure and the decreased temperature, and the heat exchanger 50 heats the anode gas. Examples of the heat medium which performs heat exchange with the anode gas in the heat exchanger 50 include water (coolant, etc.) which flowed through the fuel cell stack 12.

In the anode supply pipe 40, a plurality of injectors (two injectors in the illustrated embodiment) 52 inject a predetermined quantity of the anode gas supplied at a predetermined flow rate from the upstream side at predetermined injection pressure toward the downstream side. It should be noted that the anode system apparatus 14 may have structure including one injector 52. Alternatively, the anode system apparatus 14 may have structure including three or more injectors 52.

The ejector 54 sucks the anode off gas from the circulation bypass pipe 44 and supplies the anode gas to the fuel cell stack 12 on the downstream side, by the negative pressure generated as a result of movement of the anode gas injected from the injectors 52.

The purge valve 56 is provided in the purge pipe 46, and opens/closes the channel of the purge pipe 46. By opening the purge valve 56, the anode off gas is discharged from the circulation circuit (the anode supply pipe 40, the fuel cell stack 12, the anode discharge pipe 42, the gas liquid separator 60, and the circulation bypass pipe 44 on the downstream side of the ejector 54) of the anode system apparatus 14.

On the other hand, the gas liquid separator 60 is provided between the anode discharge pipe 42 and the circulation bypass pipe 44, and the water contained in the anode off gas discharged from the fuel cell stack 12 (water produced in the power generation) is removed from the anode off gas. A drain pipe 58 for discharging the separated liquid water and the reactant gases (hydrogen and nitrogen) is connected to the gas liquid separator 60.

Figure 2:
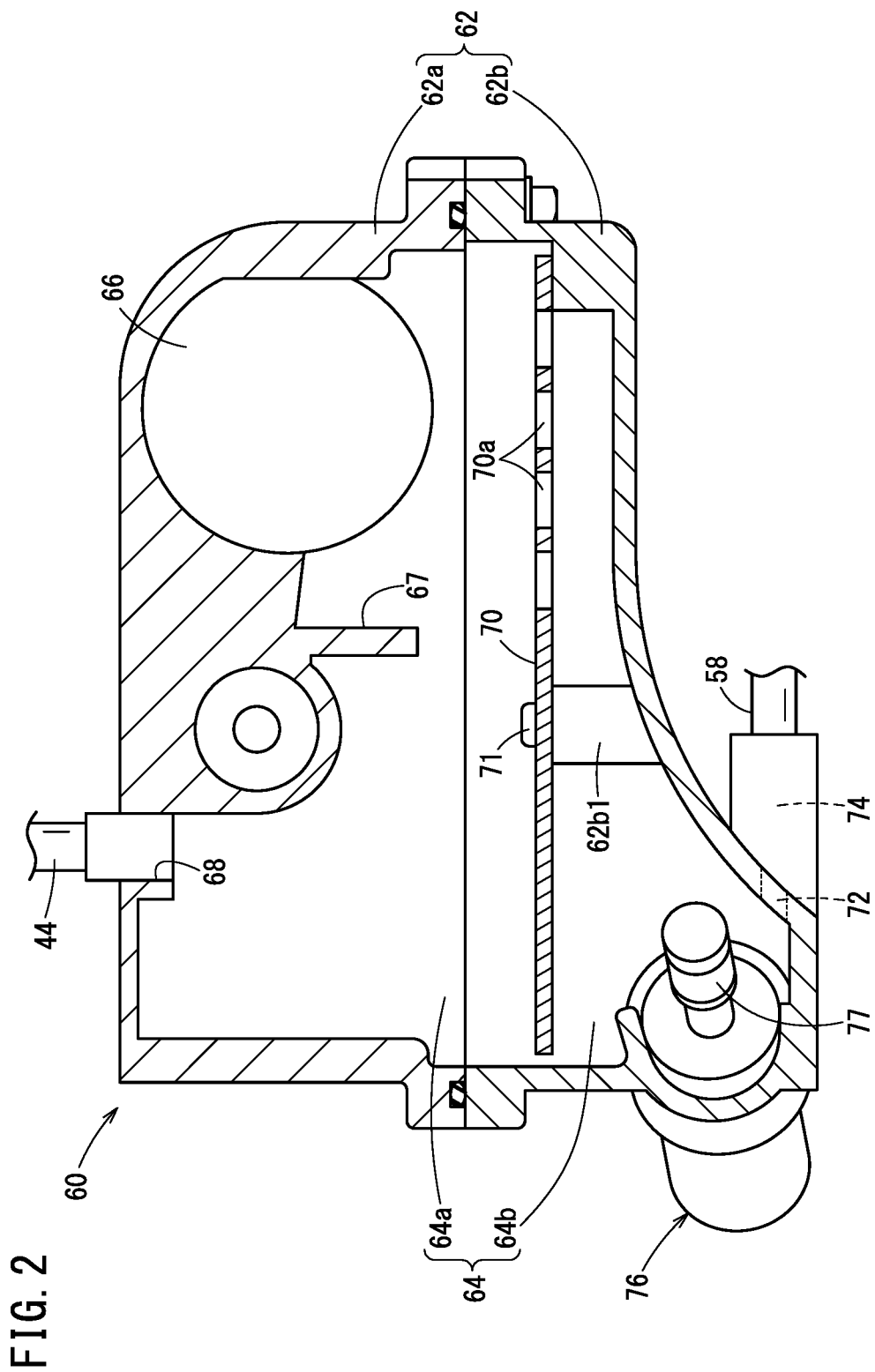
FIG. 2 is a cross sectional view showing a gas liquid separator and a water level sensor in FIG. 1.

As shown in FIG. 2, the gas liquid separator 60 includes a casing 62 provided at one end plate of the fuel cell stack 12. For example, the casing 62 is formed by joining a pair of recessed members 62a, 62b together. An internal space 64 is formed inside the casing 62, and the anode off gas of the fuel cell stack 12 flows into the internal space 64. The internal space 64 on the upper side is a gas channel 64a as a passage of the anode off gas (hydrogen, nitrogen, etc.), and the internal space 64 on the lower side functions is a collection unit 64b for storing water (condensed water).

The collection unit 64b has a tapered shape where the cross sectional area in the horizontal direction is reduced toward the lower side in the direction of gravity. The capacity of the collection unit 64b (the water level when the collection unit 64b is full) is determined to have a size where the water discharged from the fuel cell stack 12 can be accumulated sufficiently.

An inlet port 66 is formed at a suitable position of the casing 62 where the gas channel 64a is provided in the casing 62 (on the right side in FIG. 2). The anode discharge pipe 42 is connected to the inlet port 66, and the anode off gas from the fuel cell stack 12 flows into the inlet port 66. Further, the casing 62 is provided with a gas outlet port 68 connected to the circulation bypass pipe 44, at an upper position in the gravity direction above the inlet port 66. A protruding wall 67 is formed between the inlet port 66 and the gas outlet port 68. In the structure, the gas liquid separator 60 directs the anode off gas from the inlet port 66 toward the gas outlet port 68, to collide with the protruding wall 67 in a manner that the water contained in the off gas is attached to the protruding wall 67, and the liquid water drops downward.

In the casing 62, a border wall 70 having a plurality of cutouts 70a are provided between the gas channel 64a and the collection unit 64b in the casing 62. The border wall 70 is fixed by screwing an attachment screw 71 into a boss 62b1 protruding from the bottom of the recessed member 62b. The border wall 70 has a function of reducing the backsplash of water in the collection unit 64b, and directing the liquid water separated from the anode off gas in the gas channel 64a to flow through the cutouts 70a into the collection unit 64b.

Further, a water discharge port 72 connected to the drain pipe 58 is provided on the downstream side of the collection unit 64b in the casing 62 in the gravity direction. A drain valve 74 (bleed valve) for opening/closing the channel of the drain pipe 58 is provided at an end of the drain pipe 58 coupled to the water discharge port 72.

Further, the fuel cell system 10 includes a water level sensor 76 at a predetermined height position in the collection unit 64b (above the water discharge port 72). For example, the water level sensor 76 is an electrical resistance type detection sensor for detecting the water level of the water accumulated in the collection unit 64b. The water level sensor 76 is fixed to the casing 62, and includes a detection unit 77 in the form of a rod protruding into the collection unit 64b. The detection unit 77 extends obliquely with respect to the gravity direction, and includes a plurality of detection poles in the axial direction. Since the electrical resistance value between the detection poles changes depending on the water level of the water, the water level sensor 76 outputs a detection signal (voltage signal) based on the changes of the electrical resistance value. It should be noted that the water level sensor 76 is not limited to the electrical resistance type, and various methods can be adopted. For example, an electrostatic capacitance type detection sensor may be used.

The detection signal of the water level sensor 76 is transmitted to the control unit 80 which controls operation of the fuel cell system 10 (see FIG. 1). The control unit 80 receives a detection signal of the water level sensor 76, and recognizes the state of the water accumulated in the collection unit 64b of the gas liquid separator 60.

Figure 3:
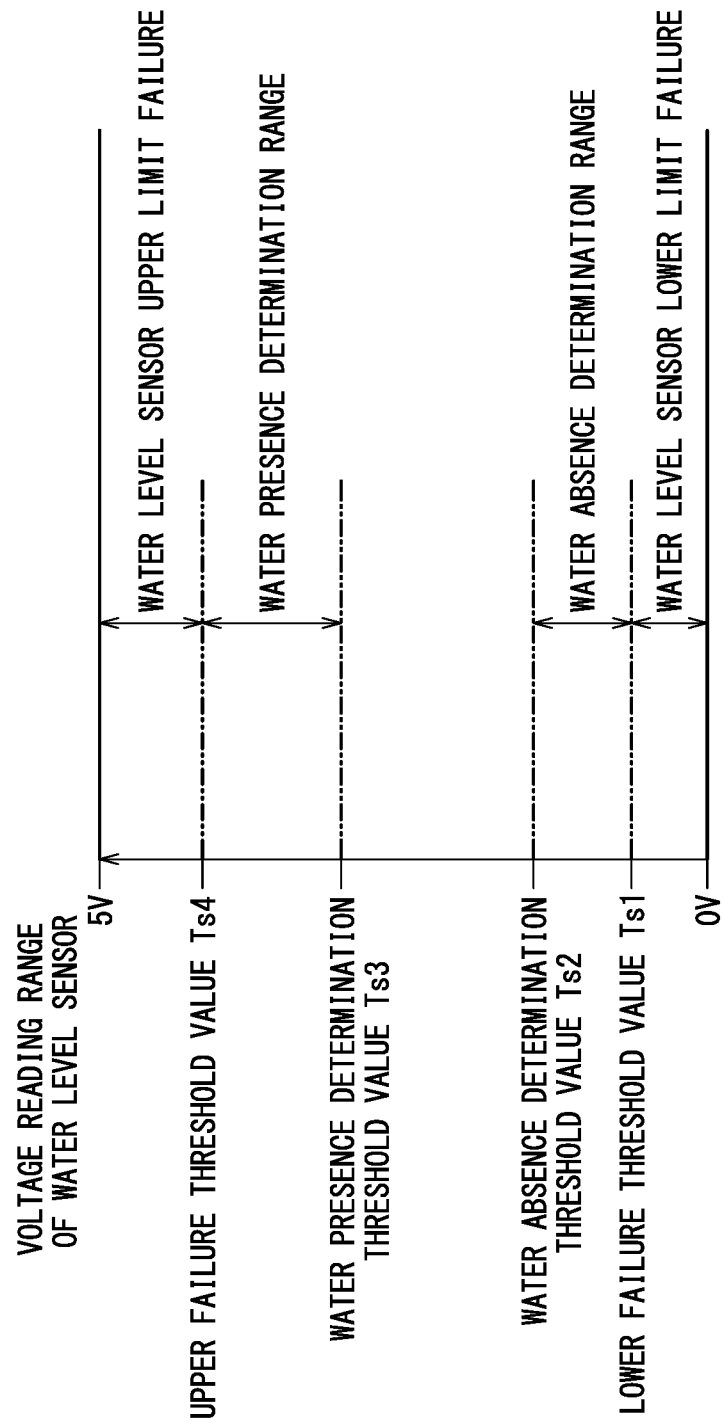
FIG. 3 is a graph showing a threshold value set in a voltage reading range of a water level sensor.

As shown in FIG. 3, a predetermined voltage reading range (e.g., 0V to 5V) is set to the detection signal of the water level sensor 76, depending on the standard of the water level sensor 76. The control unit 80 has a plurality of sensor threshold values Ts (a lower failure threshold value Ts1, a water absence determination threshold value Ts2, a water presence determination threshold value Ts3, and an upper failure threshold value Ts4) corresponding to the voltage reading range.

The lower failure threshold value Ts1 is a value for defining the detection lower limit value corresponding to the standard of the water level sensor 76. In the case where the detection signal has a value which is not more than the lower failure threshold value Ts1 (water level sensor lower limit failure: within an upper/lower limit failure range), it is possible to consider that the water level sensor 76 has abnormality of lower limit detection. The water absence determination threshold value Ts2 is a threshold value used for determining that no water is accumulated in the collection unit 64b. In the case where the detection signal has a value which is not more than the water absence determination threshold value Ts2 and above the lower failure threshold value Ts1 (falls within a water absence determination range), it is possible to consider that no water is present in the collection unit 64b. The water presence determination threshold value Ts3 is a threshold value used for determining that there is water accumulated in the collection unit 64b. In the case where the detection signal has a value above the water presence determination threshold value Ts3 and not more than the upper failure threshold value Ts4 (water presence determination range), it is possible to consider that water is present in the collection unit 64b. Further, in the case where the detection signal has a value above the water absence determination threshold value Ts2 and not more than the water presence determination threshold value Ts3, the control unit 80 can monitor the water level of the collection unit 64b based on the voltage value. The upper limit threshold value Ts4 defines the detection upper limit value corresponding to the standard of the water level sensor 76. In the case where the detection signal exceeds the upper failure threshold value Ts4 (water level sensor upper limit failure: within an upper/lower limit failure range), it is possible to consider that the water level sensor 76 has abnormality of upper limit detection. It should be noted that the water level sensor 76 may be a sensor which simply detects whether the water is present or not without monitoring the water level.

Referring back to FIG. 1, the control unit 80 (FCECU) of the fuel cell system 10 includes a processor, a memory, an input/output interface, and a computer (including a microcontroller) for performing information processing. The control unit 80 compares the detection signal of the water level sensor 76 with the above sensor threshold values Ts to determine the state of the water (water is present, ware is not present, the water level) in the collection unit 64b of the gas liquid separator 60 and the upper/lower limit failure of the water level sensor 76. The, the control unit 80 switches opening/closing of the drain valve 74 (or the purge valve 56) corresponding to the state of water in the collection unit 64b.

Further, the anode system apparatus 14 connects the purge pipe 46 to the drain pipe 58 on the downstream of the drain valve 74. The control unit 80 opens/closes the purge valve 56 of the purge pipe 46 and the drain valve 74 of the drain pipe 58 independently to discharge the anode off gas flowing through the circulation bypass pipe 44 and the water separated at the gas liquid separator 60 at different timings. The discharged anode off gas and the water are merged on the downstream of the drain pipe 58.

The anode system apparatus 14 may have a pump for circulating the anode off gas to the anode supply pipe 40 at an intermediate position of the circulating bypass pipe 44. The anode system apparatus 14 may have a valve (check valve) as a passage of the anode gas to flow in one direction.

A failure of the water level sensor 76 provided in a gas liquid separator 60 may occur in the fuel cell system 10. In particular, when a failure has occurred in the water level sensor 76 to cause the water level sensor 76 to keep outputting a detection signal indicating that water is present (hereinafter referred to as the water presence failure), the control unit 80 determines, in information processing, that the water is discharged from the drain valve 74 and the anode off gas is not discharged from the drain valve 74.

Thus, the control unit 80 performs control (behavior) of, e.g., increasing a computation value of the nitrogen partial pressure of nitrogen contained in the anode off gas, and decreasing the limit value of the current output of the fuel cell stack 12 based on the nitrogen partial pressure.

Figure 4:
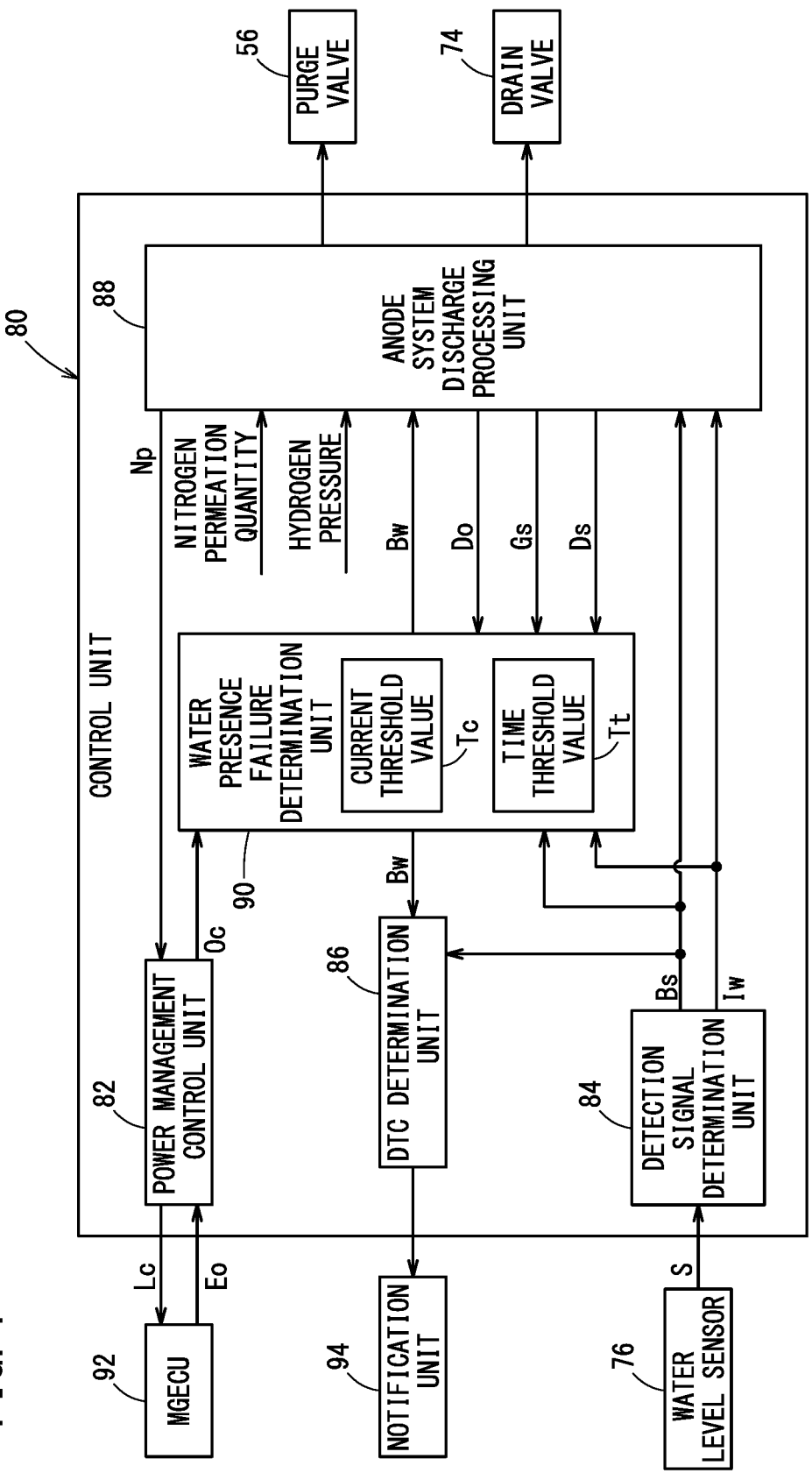
FIG. 4 is a function block diagram showing a control unit of a fuel cell system.

Therefore, the control unit 80 according to the embodiment of the present invention determines whether or not a water presence failure has occurred in the water level sensor 76 based on the predetermined condition. Specifically, as shown in FIG. 4, in the control unit 80, a power management control unit 82, a detection signal determination unit 84, a DTC determination unit 86, an anode system discharge processing unit 88, and a water presence failure determination unit 90 are provided.

The power management control unit 82 is a function unit for managing power of the fuel cell system 10. For example, the current collection value Oc (instantaneous value) of the fuel cell stack 12 is calculated based on information of the nitrogen partial pressure Np calculated by the anode system discharge processing unit 88. Further, the power management control unit 82 is configured to communicate information with an MGECU 92 which controls operation of a motor (not shown) and a generator (not shown) of the vehicle. The power management control unit 82 transmits the calculated current limitation value Lc to the MGECU 92, and obtains the power generation current instruction value Eo of the fuel cell stack 12 from the MGECU 92.

Then, the power management control unit 82 calculates the target current value Oc of the fuel cell stack 12 based on the power generation current instruction value Eo, and transmits this target current value Oc to the water presence failure determination unit 90. This process is performed because the water presence failure determination unit 90 makes a water presence failure Bw in the case where the target current value Oc is not more than the predetermined current threshold value Tc.

When the detection signal determination unit 84 communicates information with the water level sensor 76 to receive a detection signal S, the detection signal determination unit 84 determines the state of water in the gas liquid separator 60 (collection unit 64b) detected by the water level sensor 76 based on the above described sensor threshold value Ts. Then, for example, in the case where the detection signal determination unit 84 determined that an upper limit failure or a lower limit failure of the water level sensor 76 has occurred, the detection signal determination unit 84 outputs the information (upper/lower limit failure Bs) to the DTC determination unit 86.

Further, the detection signal determination unit 84 determines that water is not present in the case where the detection signal S has a value which is not more than the determination threshold value Ts2, and determines that water is present in the case where the detection signal S has a value which exceeds the water presence determination threshold value Ts3 (or water absence determination threshold value Ts2). The determination signal determination unit 84 transmits information Iw of the determined water state (water presence determination, water absence determination, and water level) to the anode system discharge processing unit 88 and the water presence failure determination unit 90.

The DTC determination unit 86 is a function unit for performing a failure management of the fuel cell system 10 (fuel cell vehicle), receives the upper/lower limit failure Bs from the detection signal determination unit 84, and receives the water presence failure BW from the water presence failure determination unit 90. The DTC determination unit 86 sets a failure code based on these items of failure information, and performs a suitable process by determining a failure level associated with the failure code beforehand. For example, in the case where the DTC determination unit 86 received the water presence failure BW, the DTC determination unit 86 notifies the information to a notification unit 94 (monitors, indicators, and speakers, etc.) of the vehicle based on the water presence failure BW. In this manner, the user of the vehicle can recognize the water presence failure BW of the water level sensor 76.

In the meanwhile, the anode system discharge processing unit 88 controls opening/closing of the purge valve 56 and the drain valve 74 by processing suitable information. For example, the anode system discharge processing unit 88 calculates the nitrogen partial pressure Np of the anode system apparatus 14 by receiving the nitrogen permeation quantity and the hydrogen pressure, and determines opening/closing of the purge valve 56 and the drain valve 74 based on the calculated nitrogen partial pressure Np. The nitrogen permeation quantity is information related to the quantity of the nitrogen gas which has permeated through the electrolyte membrane 26 of each of the power generation cells 20, and is calculated by another function unit of the control unit 80 based on the supply quantity (the flow rate, the pressure, etc.) of the cathode gas. The hydrogen pressure is pressure information of the anode gas (including the anode off gas) flowing through a circulation circuit of the anode system apparatus 14, and the hydrogen pressure is obtained from a pressure sensor (not shown) provided at a suitable position of the circulation circuit.

Further, the anode system discharge processing unit 88 receives information Iw of the water state (and the upper/lower limit failure Bs) from the detection signal determination unit 84. Further, the anode system discharge processing unit 88 receives information about the occurrence/non-occurrence of the water presence failure BW from the water presence failure determination unit 90, and calculates the water level of the collection unit 64b. At the time of calculating the water level, the quantities of the anode off gas and the water discharged from the anode system apparatus 14 are calculated based on valve opening information of the purge valve 56 and the valve opening information of the drain valve 74. The water level detected by the water level sensor 76 is corrected base on the quantities of the anode off gas and the water discharged from the anode system apparatus 14. Then, the anode system discharge processing unit 88 switches opening/closing of the drain valve 74 based on the calculated water level in the collection unit 64b and the nitrogen partial pressure Np, etc.

Further, the anode system discharge processing unit 88 has a function of determining the frozen state or the non-frozen state of the gas liquid separator 60, and the frozen state or the non-frozen state of the drain valve 74 by a known method. Further, the anode system discharge processing unit 88 transmits various items of information (the drain valve opening completion Do, the gas liquid separator state Gs (frozen state, non-frozen state), the drain valve state Ds (frozen state, non-frozen state)), to the water presence failure determination unit 90.

The water presence failure determination unit 90 is a function unit for determining a water presence failure BW of the water level sensor 76, and determines that the water presence failure BW has occurred in the case where the following main conditions (a) to (d) have been satisfied.

(a) The detection signal S of the water level sensor 76 indicates determination that water is present.

(b) The target current value Oc of the fuel cell stack 12 is not more than a predetermined current threshold value Tc.

(c) The drain valve 74 is open.

(d) The elapsed time in the states (a) to (c) is larger than the predetermined time threshold value Tt.

The main condition (a) is an essential requirement for detecting the water presence failure BW of the water level sensor 76, and the water presence failure determination unit 90 determines whether or not the water presence determination has been made based on the information Iw of the state of water from the detection signal determination unit 84.

The main condition (b) is a condition for creating a state where no water is present in the gas liquid separator 60. That is, during low power load power generation of the fuel cell stack 12, in the state where the drain valve 74 is open, the quantity of the water discharged from the drain valve 74 per unit time exceeds the quantity of the water produced in the fuel cell stack 12 per unit time. Therefore, it is possible to create the state where the produced water has been reliably discharged from the gas liquid separator 60 after elapse of certain period of time. That is, the current threshold value Tc defining the low power load power generation of the main condition (b) is a current value at which the quantity of the water produced during power generation by the fuel cell stack 12 per unit time becomes smaller than the quantity of water discharged from the gas liquid separator 60 per unit time. Depending on the power generation capability of the fuel cell stack 12 and the structure of the gas liquid separator 60, for example, the current value is set to a value around 50 [A]. It should be noted that, in the fuel cell system 10, even if the fuel cell stack 12 does not perform power generation (even if the target current value Oc is 0), since the water can be discharged from the gas liquid separator 60, it is possible to determine the occurrence of the water presence failure BW.

Further, with regard to the main condition (c), the control unit 80 recognizes the valve open state of the drain valve 74 based on the drain valve opening completion Do. Instead of adopting the structure of waiting for valve opening of the drain valve 74, the control unit 80 may perform control to forcibly open the drain valve 74 by the anode system discharge processing unit 88 as a result of satisfaction of the main conditions (a), (b).

Further, in order to determine satisfaction of the main condition (d), the water presence failure determination unit 90 has a counter (not shown) for measuring the elapsed time based on the satisfaction of the main conditions (a) to (c), and the time threshold value Tt, internally. Further, when the elapsed time counted by the counter exceeds the time threshold value Tt, it is determined that a water presence failure BW has occurred. When the elapsed time is not more than the threshold value Tt, if any one of the main conditions (a) to (c) is not satisfied, it is determined that no water presence failure BW has occurred. Information (occurrence/non-occurrence of the water presence failure BW determined by the water presence failure determination unit 90 is outputted to the DTC determination unit 86 and the anode system discharge processing unit 88, and used in processing in each of the component parts.

Further, the water presence failure determination unit 90 requires satisfaction of the following prerequisite conditions (e), (f), before performing the above failure detection.

(e) The water level sensor 76 does not have any upper/lower limit failure Bs.

(f) The gas liquid separator 60 or the drain valve 74 is not frozen.

That is, in the case (e) where the water level sensor 76 has the upper/lower limit failure Bs, in the first place, since the water level sensor 76 has the abnormality, it is no longer necessary to make a determination of the water presence failure BW. Further, in the case (f) where even only one of the gas liquid separator 60 and the drain valve 74 is frozen, it is not possible to discharge the water from the gas liquid separator 60. Therefore, it is not possible to make a determination of the water presence failure BW. Therefore, the control unit 80 performs monitoring of the main conditions based on satisfaction of the prerequisite conditions where both of the gas liquid separator 60 and the drain valve 74 are not in the frozen state, and the water level sensor 76 does not have the upper/lower limit failure Bs.

The fuel cell system 10 according to the embodiment of the present invention has the structure as described above. Next, operation of the fuel cell system 10 will be described below.

As shown in FIG. 1, in the fuel cell system 10, under the control of the control unit 80, the anode system apparatus 14 supplies and discharges the hydrogen gas to/from the fuel cell stack 12, and the cathode system apparatus 16 supplies and discharge the air to/from the fuel cell stack 12. Each of the power generation cells 20 in the fuel cell stack 12 generates electrical energy consuming the hydrogen gas which flowed through the anode gas flow field 32, and which is supplied to the anode 28, and the air which flowed through the cathode gas flow field 34, and supplied to the cathode 30. Further, in the fuel cell system 10, during power generation of the fuel cell stack 12, the coolant apparatus 18 is operated to circulate the coolant to cool the fuel cell stack 12.

In the anode system apparatus 14, in the supply of the hydrogen gas, the hydrogen gas flows out of the hydrogen tank 48 into the anode supply pipe 40. The hydrogen gas flows through the anode supply pipe 40, the heat exchanger 50, the plurality of injectors 52 and the ejector 54 in this order, and the hydrogen gas is supplied to the fuel cell stack 12. Further, the anode system apparatus 14 guides the anode off gas consumed in power generation in the fuel cell stack 12 (containing the unconsumed anode gas, the nitrogen gas, and water produced in power generation) to the gas liquid separator 60 through the anode discharge pipe 42.

In the internal space 64, the gas liquid separator 60 separates the anode off gas into the gas and the liquid water, and discharges the gas into the circulation bypass pipe 44. Further, the fuel cell system 10 detects the water level of the collection unit 64b by the water level sensor 76 provided in the gas liquid separator 60 and opens the drain valve 74 at suitable timing based on the detected water level, for discharging the liquid water from the drain pipe 58.

Then, during the power generation of the fuel cell stack 12, or when power generation of the fuel cell stack 12 is stopped, the control unit 80 detects a failure where the detection signal S of the water level sensor 76 having a voltage value indicating the presence of water is outputted continuously. In the failure detection processing method, processes of a process flow shown in FIG. 5 are performed.

In the failure detection processing method, the control unit 80 determines whether or not prerequisite conditions are satisfied for making a determination of the water presence failure BW (step S10: condition determination step). That is, the control unit 80 determines that the prerequisite conditions are satisfied in the case where the water level sensor 76 does not have the upper/lower limit failure Bs, and the gas liquid separator 60 is in the non-frozen state and the drain valve 74 is in the non-frozen state. On the other hand, the control unit 80 determines that the prerequisite conditions are not satisfied if any one of the conditions of the upper/lower limit failure Bs of the water level sensor 76, freezing of the gas liquid separator 60, and freezing of the drain valve 74 is satisfied.

Then, in the case where the prerequisite conditions are not satisfied (step S10: NO), the routine proceed to step S11 to perform a determination non-performing process (step S11). In this case, the water presence failure determination unit 90 resets the time count by the counter, and if information of the occurrence/non-occurrence of the water presence failure Bw is held in a status register, etc., a process of continuously holding the information is performed.

On the other hand, if the prerequisite conditions are satisfied (YES: step S10), the control unit 80 determines whether nor not the above main conditions (a) to (c) are satisfied (step S12: condition determination step). That is, if the detection signal S of the water level sensor 76 indicates the determination that water is present, the target current value Oc of the fuel cell stack 12 is not more than predetermined current threshold value Tc, and the drain valve 74 is open, the water presence failure determination unit 90 proceeds to step S14. If any one of these conditions (a) to (c) is not satisfied, the water presence failure determination unit 90 proceeds to step S13.

In step S13, the water presence failure determination unit 90 performs a process when determined normal. In this case, the water presence failure determination unit 90 resets the time count by the counter, and sets the status indicating that there is no water presence failure BW (normal) as information about the occurrence/non-occurrence of the water presence failure BW, in the status register, etc.

On the other hand, in step S14, the water presence failure determination unit 90 compares the elapsed time counted by the counter with the time threshold value Tt, and determines whether the elapsed time has exceeded the time threshold value Tt (failure determination step). If the elapsed time is not more than the time threshold value Tt, the routine proceeds to step S15, and if the elapsed time has exceeded the time threshold value Tt, the routine proceeds to step S16.

In step S15, the water presence failure determination unit 90 performs processes in in the middle of failure detection (failure detection ongoing process). In this case, the water presence failure determination unit 90 adds the time count by the counter, and sets the status in the middle of failure detection in the status resistor, etc.

Further, in the case where the elapsed time has exceeded the time threshold value Tt, it is considered that the water presence failure BW occurs. In step S16, the water presence failure determination unit 90 performs a process when determined abnormal. In this case, the water presence failure determination unit 90 resets the time count by the counter, and sets the status indicating the presence of the water presence failure BW (confirmation of the failure) as information of the presence/absence of the water presence failure BW in the status register, etc.

The water presence failure determination unit 90 repeats the processes in the above process flow at predetermined time intervals (for example, every one second) to add the time count of the counter, and let the time elapse. Then, by monitoring satisfaction and non-satisfaction of the main conditions (a) to (c), it is possible to accurately determine the water presence failure BW.

Further, when the anode system discharge processing unit 88 shown in FIG. 4 receives information of the water presence failure BW from the water presence failure determination unit 90, the anode system discharge processing unit 88 performs control to open the drain valve 74 all the time (forcibly open the drain valve 74) during power generation of the fuel cell stack 12 (valve opening step). That is, though the anode system discharge processing unit 88 opens/closes the drain valve 74 at suitable timing before determining the occurrence of the water presence failure BW (during the period in which it is determined that the water presence failure BW is not occurred), the anode system discharge processing unit 88 discharges water from the gas liquid separator 60 in a sustainable manner by opening the drain valve 74 all the time, after ascertaining the occurrence of the water presence failure BW.

In this manner, even if the water level of the gas liquid separator 60 becomes unclear by the water presence failure BW in the water level sensor 76, the quantity of the water accumulated in the gas liquid separator 60 is reduced. Further, since the control unit 80 recognizes that the drain valve 74 is open all the time because the water level sensor 76 has the water presence failure BW, the control unit 80 can correct the concentration of the anode gas (hydrogen pressure relative to the nitrogen partial pressure Np) in the circulation circuit. As a result, it becomes possible to suppress decrease in the current limit value Lc of the fuel cell stack 12 based on the nitrogen partial pressure Np. Since the current limit value Lc is not decreased, the fuel cell system 10 can rapidly and stably track the main current of the fuel cell stack 12 for the power generation instruction value Eo of the MGECU 92. It should be noted that, in the scavenging control when power generation of the fuel cell stack 12 is stopped, or during the stop of power generation, even if the drain valve 74 is designated to be opened forcibly, it is preferable to close the drain valve 74.

Further, when the DTC determination unit 86 receives information of the water presence failure BW, the DTC determination unit sets a failure code corresponding to the water presence failure BW, and notifies the user of the information through the notification unit 94 of the vehicle (notification step). Therefore, it becomes possible for the user to perform maintenance operation, etc. of the vehicle as necessary. On the other hand, a maintenance service provider can take a suitable measure easily based on the failure code of the water presence failure BW of the water level sensor 76.

In should be noted that the preset invention is not limited to the above embodiment, and various modifications may be made in line with the gist of the present invention. For example, though the fuel cell system 10 is configured to determine the failure of the water level sensor 76 of the gas liquid separator 60 provided for the anode system apparatus 14, as long as the auxiliary device of the fuel cell system 10 has the water level sensor 76, it is possible to make a determination of the same kind. Therefore, for example, it may be possible to adopt structure of determining the failure of the water level sensor of the gas liquid separator (not shown) provided in the cathode system apparatus 16 of the fuel cell system 10.

The technical concepts and advantages understood from the above embodiment will be described below.

According to an aspect of the present invention, the failure detection processing method of detecting a failure of the detection sensor (water level sensor 76) capable of detecting the presence/absence of water accumulated in the gas liquid separator 60 connected to the fuel cell stack 12 is provided. The method includes the condition determination step of determining by the control unit 80 that the main conditions have been satisfied, when the detection sensor detects the presence of water, the power generation current value Tc of the fuel cell stack 12 is not more than the power generation current value (target current value Oc) of the fuel cell stack 12, the drain valve 74 for discharging water in the gas liquid separator 60 is open, and the failure determination step of determining by the control unit 80 that the water level sensor has a failure, in the case where the main conditions are kept satisfied for the time period which is larger than the time threshold value Tt.

The above failure detection processing method includes the condition determination step and the failure determination step. Accordingly, it is possible to simply and accurately determine the failure of the water level sensor 76 (water presence failure BW). That is, in the case where the power generation current value of the fuel cell stack 12 is not more than the predetermined current threshold value Tc, and the drain valve 74 is open, water is discharged from the gas liquid separator 60. Notwithstanding, in the case where the water level sensor 76 determines that the water is present even if the elapsed time exceeds the time threshold value Tt, it can be regraded that a failure has occurred in the water level sensor 76 and the detection signal S indicating the presence of water is kept transmitted.

Further, the gas liquid separator 60 is configured to supply the anode gas to the fuel cell stack 12, and provided in the circulation circuit of the anode system apparatus 14 which is configured to discharge the anode off gas from the fuel cell stack 12. In this manner, since the drain valve 74 is open based on the water level of the water level sensor 76, a liquid water can be discharged from the circulation circuit of the anode system apparatus 14. Further, in the case where the control unit 80 determines the occurrence of a water presence failure BW in the water level sensor 76, the control unit 80 switches the control to suitable alternative control to make it possible to discharge the anode off gas and/or the liquid water from the circulation circuit.

Further, the control unit 80 performs the valve opening step of opening the drain valve 74 all the time during power generation by the fuel cell stack 12, in the case where a failure of the water level sensor 76 (water presence failure BW) has occurred in the failure determination step. In this manner, in the failure detection processing method, in the case where the failure of the water level sensor 76 is determined, it is possible to reliably discharge the liquid water from the drain valve 74 which is open all the time, and suppress the quantity of the liquid water accumulated in the gas liquid separator 60. As a result, it is possible to suitably suppress the liquid water from being retained in the gas liquid separator 60 otherwise causing the inconveniences (increase in the nitrogen partial pressure Np in the anode system apparatus 14, freezing, etc. of the gas liquid separator 60 and/or the drain valve 74).

Further, in the case where the failure (water presence failure BW) of the water level sensor 76 is determined in the failure determination step, the control unit 80 performs a notification step of notifying the failure of the water level sensor 76 by the notification unit 94. Accordingly, the user can easily recognize the failure of the water level sensor 76, and take the required measure promptly.

Further, the current threshold value TC compared with a power generation current value of the fuel cell stack 12 is a current value where the quantity of water produced during power generation of the fuel cell stack 12 per unit time is smaller than the quantity of water discharged from the gas liquid separator 60 per unit time. Accordingly, in the failure detection processing method, it is possible to reliably reduce the liquid water of the gas liquid separator 60, and it becomes possible to create the state where there is no liquid water in the gas liquid separator 60.

Further, in the condition determination step, in the condition determination step, as the prerequisite conditions before determining the main conditions, it is determined that the gas liquid separator 60 and the drain valve 74 are not frozen. In this manner, in the failure detection processing method, in the case where the gas liquid separator 60 or the rain valve 74 has been frozen, it is possible to avoid making an unnecessary failure determination of the water level sensor 76.

Further, the control unit 80 is configured to determine that the detection sensor has the upper/lower limit failure Bs of the water level sensor 76 in the case where the value of the detection signal S of the water level sensor 76 falls within the predetermined upper/lower limit failure range, and in the condition determination step, as a prerequisite condition before determining the main condition, it is determined that the upper/lower limit failure Bs has not occurred in the water level sensor 76. In this manner, in the failure detection processing method, in the case where the water level sensor 76 has the upper/lower limit failure Bs, it is possible to avoid making the unnecessary failure determination of the water level sensor 76.

What is claimed is:

1. A failure detection processing method of detecting a failure of a detection sensor capable of detecting presence and absence of water accumulated in a gas liquid separator connected to a fuel cell stack, the method comprising:
   a condition determination step of determining by a control unit that a main condition has been satisfied, when the detection sensor detects the presence of any water, a power generation current value of the fuel cell stack is not more a predetermined current threshold value, and a drain valve configured to discharge the water in the gas liquid separator is open; and
   a failure determination step of determining by the control unit that the detection sensor has a failure, in a case where the main condition is kept satisfied for a time period which is larger than a time threshold value.

2. The failure detection processing method according to claim 1, wherein the gas liquid separator is configured to supply an anode gas to the fuel cell stack, and provided in a circulation circuit of an anode system apparatus which is configured to discharge an anode off gas from the fuel cell stack.

3. The failure detection processing method according to claim 1, comprising a valve opening step of opening the drain valve or maintaining the drain valve open by the control unit at all times during power generation by the fuel cell stack, in a case where a failure of the detection sensor has been determined in the failure determination step.

4. The failure detection processing method according to claim 1, wherein in a case where occurrence of a failure in the detection sensor is determined in the failure determination step, the control unit performs a notification step of notifying the failure of the detection sensor by a notification unit.

5. The failure detection processing method according to claim 1, wherein the predetermined current threshold value compared with the power generation current value of the fuel cell stack is a current value where a quantity of water produced during power generation by the fuel cell stack per unit time is smaller than a quantity of water discharged from the gas liquid separator per unit time.

6. The failure detection processing method according to claim 1, wherein in the condition determination step, as a prerequisite condition before determining the main condition, it is determined that the gas liquid separator and the drain valve are not frozen.

7. The failure detection processing method according to claim 1, wherein the control unit is configured to determine that the detection sensor has an upper or lower limit failure in a case where a value of a detection signal of the detection sensor falls within a predetermined upper or lower limit failure range; and in the condition determination step, as a prerequisite condition before determining the main condition, it is determined that the upper or lower limit failure has not occurred in the detection sensor.

\* \* \* \* \*